United States Patent
Conlon et al.

(10) Patent No.: US 10,596,917 B2
(45) Date of Patent: Mar. 24, 2020

(54) VEHICLE AND ELECTRICAL SYSTEM WITH DUAL BATTERY MODULES

(71) Applicant: GM Global Technology Operations LLC, Detroit, MI (US)

(72) Inventors: Brendan M. Conlon, Rochester Hills, MI (US); Shifang Li, Shelby Township, MI (US); Kris Sevel, Rochester Hills, MI (US); Russell K. Steele, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 16/102,802

(22) Filed: Aug. 14, 2018

(65) Prior Publication Data

US 2020/0055404 A1 Feb. 20, 2020

(51) Int. Cl.
*H02J 7/00* (2006.01)
*B60L 53/30* (2019.01)
*B60L 53/14* (2019.01)
*B60K 6/52* (2007.10)

(52) U.S. Cl.
CPC ............... *B60L 53/30* (2019.02); *B60L 53/14* (2019.02); *B60K 6/52* (2013.01); *B60L 2230/30* (2013.01); *B60Y 2200/91* (2013.01); *B60Y 2200/92* (2013.01); *B60Y 2300/91* (2013.01); *B60Y 2400/61* (2013.01)

(58) Field of Classification Search
CPC .................................. B60L 53/30; B60L 53/14
USPC ............................. 320/109; 701/22; 307/9.1
See application file for complete search history.

(56) References Cited

U.S. PATENT DOCUMENTS

| 2015/0273995 | A1* | 10/2015 | Muto | .................... B60L 7/14 180/68.5 |
| 2016/0211680 | A1* | 7/2016 | Ganor | ................... H02J 7/0011 |

* cited by examiner

*Primary Examiner* — Zixuan Zhou
(74) *Attorney, Agent, or Firm* — Quinn IP Law (57) ABSTRACT

An electrical system includes cables, a DC charge connector, first and second battery modules, a splice device, and a controller. Each battery module has first, second, third, and fourth electrical connectors receiving a respective one of the cables. The battery modules are connected to each other via the cables, and further have first, second, third, and fourth switches that connect battery cell strings to one or more connectors. The charge connector is connected to one of the cables between the first electrical connectors. The splice device connects the charge connector to the first connector of the first battery module and to a pair of the cables. A charging current may be split between the battery modules. The controller selectively establishes parallel charging, parallel drive, and separate drive and charging modes for each battery module. The system may have an independent drive mode.

19 Claims, 4 Drawing Sheets

| VM | SA1/SA2 | SA3 | SA4 | SB1/SB2 | SB3 | SB4 |
|---|---|---|---|---|---|---|
| P-Ch | 0 or 1 | 1 | 1 | 0 or 1 | 1 | 1 |
| A-Ch | 0 or 1 | 1 | 1 | 0 or 1 | 0 | 0 |
| B-Ch | 0 or 1 | 0 | 0 | 0 or 1 | 1 | 1 |
| PD | 1 | 0 | 0 | 1 | 0 | 0 |
| A-D | 1 | 0 | 0 | 0 | 0 | 0 |
| B-D | 0 | 0 | 0 | 1 | 0 | 0 |

FIG. 3

| VM | SA1 | SA2 | SA3 | SA4 | SB1 | SB2 | SB3 | SB4 |
|---|---|---|---|---|---|---|---|---|
| P-Ch | 0 or 1 | 1 | 1 | 1 | 1 | 0 or 1 | 1 | 1 |
| A-Ch | 0 or 1 | 0 | 1 | 1 | 1 | 0 | 1 | 0 |
| B-Ch | 0 | 1 | 0 | 1 | 0 | 0 or 1 | 1 | 1 |
| PD | 1 | 1 | 1 | 0 | 1 | 1 | 0 | 1 |
| A-D | 1 | 1 | 1 | 0 | 0 | 1 | 0 | 1 |
| B-D | 1 | 0 | 1 | 0 | 1 | 1 | 0 | 1 |
| IND-D | 1 | 1 | 0 | 0 | 1 | 1 | 0 | 0 |

VEHICLE AND ELECTRICAL SYSTEM WITH DUAL BATTERY MODULES

INTRODUCTION

An electric powertrain includes one or more polyphase/alternating current (AC) electric machines. The individual phase windings of each electric machine are energized using a power inverter module and a high-voltage, multi-cell direct current (DC) battery pack. Switching state control of semiconductor switches located within the power inverter module ultimately generates an AC output voltage suitable for energizing the phase windings. The energized phase windings ultimately induce torque-producing machine rotation and associated motor torque.

The high-voltage battery pack forms a core part of a rechargeable energy storage system (RESS) in modern electric or hybrid electric vehicles, as well as other mobile or stationary high-voltage electrical systems. The battery pack may be selectively recharged in certain system configurations using charging power provided by an off-board power supply. When the off-board power supply produces a charging voltage having an AC waveform, an AC-DC converter located aboard the vehicle or other system being charged converts the AC waveform to a DC waveform suitable for charging the individual battery cells of the battery pack. A DC fast-charging system may be used as an alternative to the AC charging station as a relatively high-power/high-speed charging option.

SUMMARY

The present disclosure relates to a circuit topology for an electric or hybrid electric vehicle in which identically configured high-voltage battery modules are used together in a battery pack to provide a dual-RESS approach. In various embodiments, the battery modules are discharged or charged in parallel, with the disclosed topology characterized by an absence of a series charging mode. In other words, rather than charging the two battery modules or the dual RESSs with the same charging current, the present disclosure instead contemplates a split-charge approach in which both battery modules are charged with the same charging voltage, e.g., 400 volts. An all-wheel drive (AWD) configuration is also enabled, with front and rear drive units respectively connected to and primarily powered by an associated battery module.

The disclosed embodiments enable parallel charging of the battery modules using an offboard DC fast-charger. One embodiment minimizes fast-charge current flowing through components of the battery pack and is suited for high-current DC fast-charging. Another AWD embodiment enables independent operation of front and rear propulsion systems during discharge.

The disclosed topology enables full operating mode flexibility during propulsion/drive and charging modes via switching state control of contactors within each RESS. The present approach enables drive operations to be powered by a single RESS and also provides multiple methods of balancing or equalizing states of charge (SOC) of the battery modules via parallel charge/discharge or independent RESS operation. Beneficially, a single RESS configuration may be used as a building block, with sufficient flexibility for implementing the various operating modes through simple external cable connections. As a result, high-current (e.g., 500 A or more) delivery during DC fast-charging operations is possible without necessarily requiring redesign of the RESS to include high-current hardware.

In a possible embodiment, an electrical system for use with an off-board DC charging station includes a plurality of electrical cables, a DC charge connector configured to connect to the offboard DC fast-charging station, and first and second battery modules. Each battery module has three or more electrical connectors configured to receive a respective one of the electrical cables. The first and second battery modules are electrically interconnected to each other via the electrical cables between a second electrical connector of the first and second battery modules, and further have first, second, third, and fourth switches that selectively connect battery cell strings to one or more of the electrical connectors. The DC charge connector is electrically connected to one of the electrical cables between a first electrical connector of the first and second battery modules.

As part of the disclosed embodiment, a splice device splits a charging current from the fast-charging station is between the battery modules. The splice device may be a junction between three cables, or integrated into a DC charge connector such that two cables or connectors (one per battery module) connect to the splice device. A controller is in communication with the switches of each of the battery modules. The controller is configured to receive input signals indicative of a requested operating mode of the battery pack. In response to the input signals, the controller commands an open/closed state of the switches of the two battery modules, via a set of switching control signals, to thereby selectively establish an operating mode inclusive of: a parallel charging mode, a parallel drive mode, and separate drive and charging modes for each of the first and second battery modules.

The battery modules may have a respective voltage capacity of at least 400-500 volts.

The first and second switches of the two battery modules, when in a closed state, connect the battery cell strings of a respective one of the first and second battery modules to the second and third electrical connectors of the first and second battery modules, respectively. The third and fourth switches of the first and second battery modules, respectively, when in a closed state, connect the battery cell strings of a respective one of the first and second battery modules to the first electrical connector of the first and second battery modules, respectively.

The electrical system may include first and second high-voltage accessory modules that are directly connected to the third electrical connector of the first and second battery modules, respectively. In the parallel charging mode, the first and second switches of the respective first and second battery modules, in a closed state, connect the first and second battery modules to the respective high-voltage accessory module.

The electrical system may include first and second traction power inverter modules (TPIMs) directly connected to the third electrical connector of the first and second battery modules, respectively, and first and second electric machines connected to the first and second TPIMs, respectively. Independent operation of the front and rear TPIMs is thus possible.

The electrical system may be used aboard a motor vehicle having front and rear drive wheels respectively connected to front and rear drive axles. The controller in such an embodiment is configured to discharge the first and second battery modules singly or in parallel to provide the vehicle with all-wheel drive propulsion capability.

The first and second battery modules have a respective first surface to which the electrical connectors of the respective first and second battery modules are connected, and a second surface positioned opposite the first surface and characterized by an absence of the electrical connectors, and wherein the first and second battery modules are arranged in the battery pack such that the second surfaces are positioned immediately adjacent to one another.

The controller may be configured to detect a fault mode in which a fault is present in the first or second battery modules, and to enter a default drive or charging mode using the first or second battery module that is not experiencing the fault.

At least one switch of the first, second, third, and fourth switches of the first and second battery modules may be an electro-mechanical contactor in some embodiments.

Also disclosed is an electrical system having a battery pack, the DC charge connector, and a controller. The electrical system includes first and second battery modules electrically interconnected to each other via electrical cables, the first and second battery modules having respective battery cell strings, first, second, and third electrical connectors, and first, second, third, and fourth switches that selectively connect the respective battery cell strings to one or more of the first, second, and third electrical connectors. The first electrical connector of the first battery module is connected to the second electrical connector of the second battery module via one of the cables, and the first electrical connector of the second battery module is connected to the second electrical connector of the first battery module via another of the cables. The DC charge connector is electrically connected to one of the electrical cables between the first electrical connectors of the first and second battery modules, with the DC charge connector configured to electrically connect the battery pack to an off-board DC fast-charging station.

The controller in this embodiment is in communication with the first, second, third, and fourth switches of each of the first and second battery modules, and is configured to receive input signals indicative of a requested operating mode of the battery pack. In response to the input signals, the controller selects an open/closed state of each of the switches, via a set of switching control signals, to thereby selectively establish: a parallel charging mode, a parallel drive mode, drive and charging modes for each of the first and second battery modules, and an independent drive mode in which the first and second battery modules are operable for independently powering the respective second and third electrical connectors in the event of a failure of the respective second or first battery module.

A motor vehicle is also disclosed having front and rear drive wheels rotatable about respective front and rear drive axes, front and rear TPIMs, front and rear electric machines connected to and driven by the front and rear TPIMs, respectively, and a modular battery pack. The battery pack includes electrical cables external to the battery pack, and first and second battery modules electrically interconnected to each other via the electrical cables, with each module having a respective battery cell string, first, second, and third electrical connectors, and first, second, third, and fourth switches. The switches selectively connect the respective battery cell strings to one or more of the first, second, and third electrical connectors, with the front and rear TPIMs being directly connected to the third electrical connector of the first and second battery modules, respectively.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Figure 1:
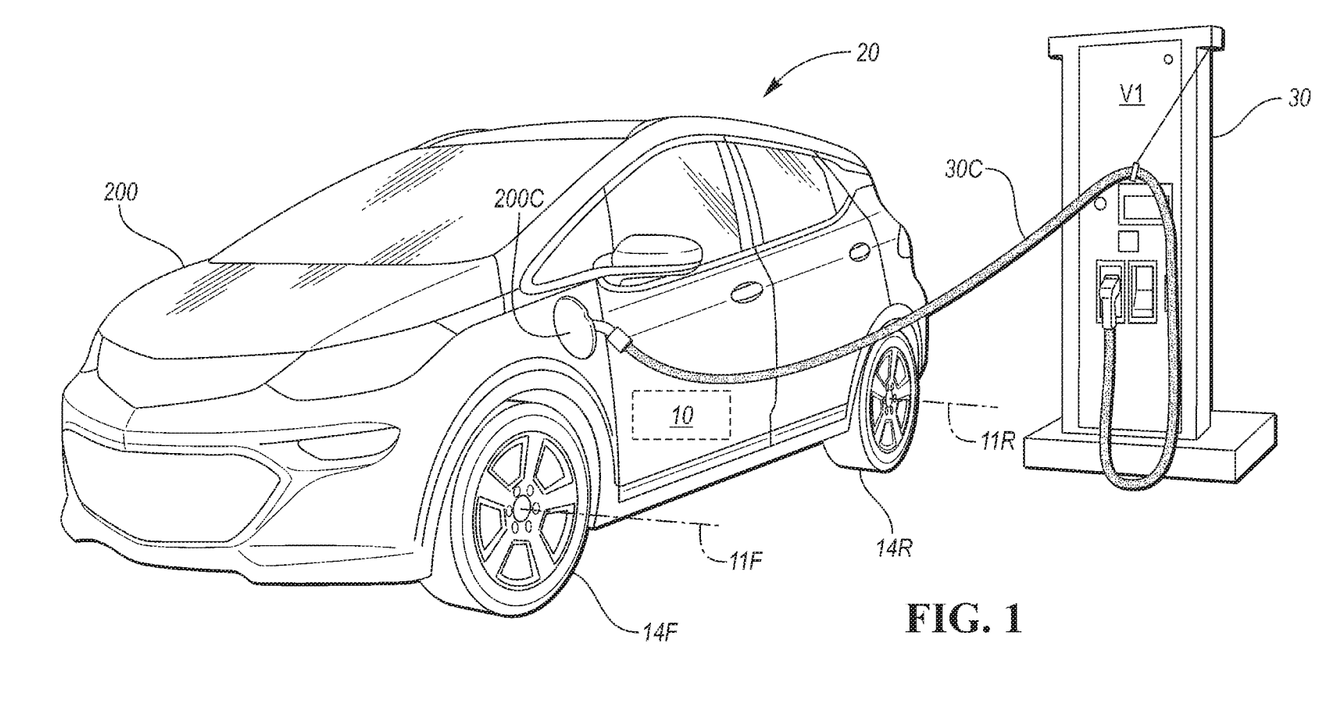
FIG. 1 is a schematic illustration of an example motor vehicle undergoing a DC fast-charging operation, with the vehicle having a high-voltage battery pack constructed from a pair of lower-current rechargeable energy storage systems (RESSs) and associated battery modules, with a switching control circuit as described herein.

Referring to the drawings, wherein like reference numbers refer to the same or like components in the several Figures, a modular, multi-cell, dual-rechargeable energy storage system (RESS) high-voltage battery pack 10 is shown schematically in FIG. 1. The battery pack 10 may be used as part of a powertrain of an example motor vehicle 20 having a vehicle body 200. The vehicle 20 is shown undergoing a direct current (DC) fast-charging operation in which the battery pack 10 is electrically connected to an off-board DC fast-charging station 30 via a vehicle charging port 200C.

The vehicle charging port 200C is internally connected to a DC charge connector 40 (see FIGS. 2 and 4) using a length of high-voltage charging cable 30C. Although not shown in FIG. 1, the end connection of the high-voltage charging cable 30C to the charging port 200C may be an SAE J1772 or an CHAdeMO charge connector, or another suitable regional or national standard charging plug or connector. The present teachings are independent of the particular charging standard ultimately employed in a DC fast-charging operation involving the DC fast-charging station 30, and therefore the above-noted examples are merely illustrative.

The battery pack 10, the internal structure and switching control of which is described in detail below with reference to FIGS. 2-5, may be used as part of a high-voltage electrical system of the motor vehicle 20, or as part of other electrical systems such as stationary or mobile power plants, robots, or platforms. For vehicular applications, non-motor vehicles such as aircraft, marine vessels, and rail vehicles may enjoy similar benefits. Likewise, the battery pack 10 may be used as part of a powertrain of a mobile system such as the example vehicle 20, or in configurations in which the DC fast-charging station 30 is mobile and the system in which the battery pack 10 is employed remains stationary. For illustrative consistency, an example application of the battery pack 10 used as an integral part of an electrical system of the vehicle 20 in a motor vehicle context will be described hereinafter without limiting the present disclosure to such an embodiment, and thus the vehicle 20 and its electrical system are used interchangeably unless otherwise noted.

The vehicle 20 of FIG. 1 includes front and rear drive wheels 14F and 14R, respectively. The drive wheels 14F and 14R rotate about separate front and rear drive axes 11F and 11R, respectively, in an all-wheel drive (AWD) configuration of the vehicle 20. As described below with reference to FIGS. 2 and 4, in such an AWD embodiment the drive axes 11F and 11R correspond to the axes of rotation of separate drive axles (not shown), and may be individually powered by electric machines 60 ($M_A$) and 160 ($M_B$) energized to function as traction motors via corresponding traction power inverter modules 25 and 125. The embodiment of FIG. 4 in particular further allows for independent operation of front and rear propulsion systems, i.e., the power inverter modules 25 and 125 and associated electric machines 60 and 160.

The vehicle body 200 shown in FIG. 1 may define or include the charging port 200C at a user-accessible external location. The vehicle 20 may be variously embodied as a plug-in electric vehicle having the battery pack 10, e.g., a multi-cell lithium ion, zinc-air, nickel-metal hydride, or lead acid battery pack 10, that can be selectively recharged via a DC fast-charging voltage V1 from the off-board DC fast-charging station 30. When the vehicle 20 is in operation, switching control of the battery pack 10 is performed by a controller 50 (see FIG. 2) to ultimately generate and deliver motor torque to the drive wheels 14F and/or 14R and thereby propel the vehicle 20, or to perform other useful work. Thus, the battery pack 10 and the controller 50 together form a modular battery pack system.

Figure 2:
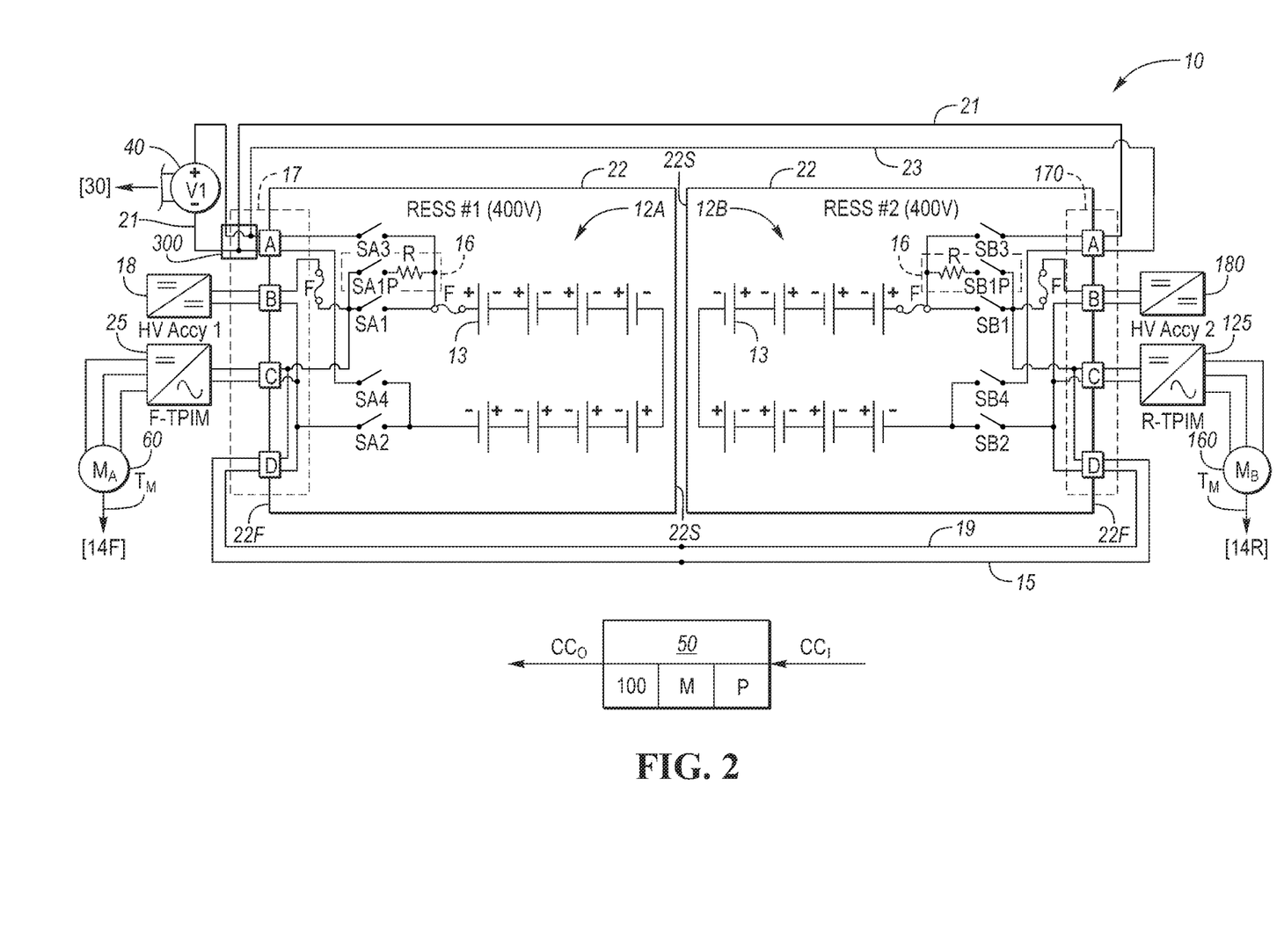
FIG. 2 is a schematic circuit diagram of a dual-RESS electrical system and a controller usable as part of the example vehicle shown in FIG. 1 according to a split-charge embodiment in which the same voltage is applied to the two RESSs.

Referring to FIG. 2, the battery pack 10 shown schematically in FIG. 1 may include two battery modules 12A and 12B, which may be used as a core part of respective first and second rechargeable energy storage systems RESS #1 and RESS #2. In the depicted example embodiment, the battery modules 12A and 12B are substantially identical, i.e., have the same internal components and equal voltage capacities, for example 400-500 volts, although other voltage levels may be envisioned. The battery modules 12A and 12B may be optionally connected together back-to-back as shown in FIG. 2 and thereafter controlled by the controller 50 using switching control logic, as illustrated in a logic tables 35 and 135 of FIGS. 3 and 5, respectively, to receive or output power from or to a corresponding front traction power inverter module (F-TPIM) or rear traction power inverter module (R-TPIM) 25 or 125 each connected to an electric machine 60 or 160 on a respective one of the drive axles 11F or 11R of FIG. 1.

As described below with reference to FIG. 3, the disclosed configuration of the battery pack 10 of FIG. 2 enables selection by the controller 50 of a parallel charging mode, individual charging modes for the two battery modules 12A and 12B, a parallel drive mode, and a separate drive mode for each of the drive axles 11F and 11R using the respective battery modules 12A and 12B.

Switching state control of the battery pack 10 in FIG. 2 is performed by operation of a controller 50 having a processor (P) and memory (M), i.e., via transmission of a set of switching control signals (arrow $CC_O$). Memory (M) includes tangible, non-transitory memory, e.g., read only memory, whether optical, magnetic, flash, or otherwise. The controller 50 also includes application-sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry.

The controller 50 is programmed to execute instructions 100 embodying a switching control method, with the controller 50 receiving input signals (arrow $CC_I$) indicative of a driver-requested or autonomously-requested operating mode of the battery pack 10 and, in response, outputting the switching control signals (arrow $CC_O$). The input signals (arrow $CC_I$) may be determined during charging as part of ongoing communication between the controller 50 and the DC fast-charging station 30 of FIG. 1 upon connection of the vehicle 20 to the station 30 of FIG. 1, such as when the station 30 communicates its maximum charging voltage (V1) to the controller 50.

The individual battery modules 12A and 12B may be electrically connected to separate front and rear drive components/propulsion systems of the vehicle 20, parts of which are shown in FIG. 2 as the respective F-TPIM 25 and R-TPIM 125. To this end, the battery modules 12A and 12B are equipped with respective high-voltage electrical connector sets 17 and 170. The electrical connector sets 17 and 170 include a respective plurality of electrical connectors, such as four electrical connectors labeled A, B, C, and D for clarity. The connectors A, D, and C may be alternatively identified as first, second, and third connectors, respectively, with optional connector B being a fourth connector. The traction power inverter modules 25 and 125 are respectively connected to the battery modules 12A and 12B via the electrical connectors C. Additionally, high-voltage accessory circuits 18 and 180, respectively labeled "HV Accy 1" and "HV Accy 2" in FIG. 2, may be connected to the respective battery modules 12A and 12B via the electrical connectors B.

As used herein, the terms "front" and "rear" refer to relative driving positions with respect to a front and rear end of the vehicle 20 shown in FIG. 1, in which the front and rear drive axes 11F and 11R of corresponding drive axles are connected to the respective front and rear drive wheels 14F and 14R. Thus, the F-TPIM 25 and its corresponding electric machine 60 may power the front drive wheels 14F and the R-TPIM 125 and another corresponding electric machine 160 may power the rear drive wheels 14R. The accessory circuits 18 and 180 may be similarly disposed to perform front or rear-designated accessory functions, such as an auxiliary power module, a high voltage motor control module, or a battery cooling module performing thermal regulation functions of the respective battery modules 12A and 12B.

The battery modules 12A and 12B shown in FIG. 2 may be contained within a respective battery housing 22. Each battery housing 22 has respective first and second faces 22F and 22S. The first faces 22F are lateral sides of the battery housing 22 containing the set of connectors 17 and 170. The second faces 22S are diametrically opposite the first faces 22F and are characterized by an absence of the set of electrical connectors 17 and 170. In the example configurations of FIGS. 2 and 4, the battery modules 12A and 12B are arranged back-to-back, i.e., with the second faces 22S positioned immediately adjacent to one another and the first faces 22F providing access for operators when interconnecting the battery modules 12A and 12B during assembly of the battery pack 10. Other embodiments may be envisioned in which the first and second battery modules 12A and 12B, or the RESS #1 or #2, has a slanted surface or a protrusion, and/or with some of the sets of connectors 17 or 170 located on a top or bottom of the housings 22. Thus, the example "back-to-back" configuration is non-limiting, with other packaging embodiments being possible, e.g., one in which the battery module 12B is rotated 180° relative to the schematic depiction of FIGS. 2 and 4.

Still referring to FIG. 2, first, second, third, and fourth electrical cables 15, 19, 21, and 23 of a voltage-suitable insulation and current-suitable gage construction are used to interconnect the battery modules 12A and 12B via the sets of electrical connectors 17 and 170. Specifically, the first and second electrical cables 15 and 19 extend directly between the electrical connectors D such that the electrical connectors D extend externally with respect to the housings 22. Similarly, the electrical connectors A are directly connected to each other via the third and fourth electrical cables 21 and 23. The HV accessory circuits 18 and 180 plug directly into the electrical connectors B. In the same manner, cables connected to the respective front and rear TPIMs 25 and 125 directly plug into the electrical connectors C.

As shown, the output of the DC charge connector 40, i.e., the physical multi-pin receptacle configured to receive the charging cable 30C shown in FIG. 1 as indicated by [30] in FIG. 2, is split via a splice device 300 to split the charging current delivered to the battery pack 10. The current is evenly split, ideally, with the actual split varying from ideal based on whether the battery modules 12A and 12B are mismatched in resistance or state of charge. Such a splice device 300 may be integrated into the charging inlet proximate the DC charge connector 40 or within the vehicle 20 of FIG. 1. If integrated into the charging inlet, the battery pack 10 may forego use of high-current (e.g., 500 A) hardware components within the vehicle 20 or the battery modules 12A and 12B.

Internally, the battery modules 12A and 12B are identically configured as noted above. That is, the battery modules 12A and 12B have a respective plurality of battery cells 13 with positive (+) and negative (−) terminals, hereinafter collectively referred to as battery cell strings 13, fuses F, and a pre-charge circuit 16 having a pre-charge resistor (R). Additionally, the battery module 12A includes a first plurality of switches individually labeled as SA1, SA2, SA3, SA4, and SA1P, with the switch SA1P being a designated pre-charge switch. Similarly, the battery module 12B includes an identical second plurality of switches, individually labeled as SB1, SB2, SB3, SB4, and SB1P, with SB1P being a pre-charge switch.

The battery modules 12A and 12B may provide propulsion power to the vehicle 20 shown in FIG. 1. The depicted configuration is intended to provide the requisite electrical connections for interfacing the battery pack 10 to the vehicle 20 in an AWD configuration using the two power inverters, i.e., F-TPIM 25 and R-TPIM 125, the HV accessory circuits 18 and 180, and the DC charge connector 40, and the ultimate connection of such components to the DC fast-charging station 30 shown in FIG. 1.

Using the disclosed approach of FIG. 2, contactor failure occurring within either battery module 12A or 12B will not preclude drive mode availability, as propulsion-related contactors are not used for parallel charging, as explained below with reference to FIG. 3. Also, a single battery module configuration enables multiple levels of battery output power and energy. Wiring embodied by the respective first, second, third, and fourth electrical cables 15, 19, 21, and 23, all of which extend external to the battery housings 22 to facilitate manufacturing and assembly of the battery pack 10, enables the identical configuration of the battery modules 12A and 12B. The depicted wiring circuit of FIG. 2 also allows the controller 50 to configure the battery modules 12A and 12B in real-time for mode-specific charging of the battery pack 10 or discharge/propulsion of the vehicle 20 shown in FIG. 1.

Figure 3:
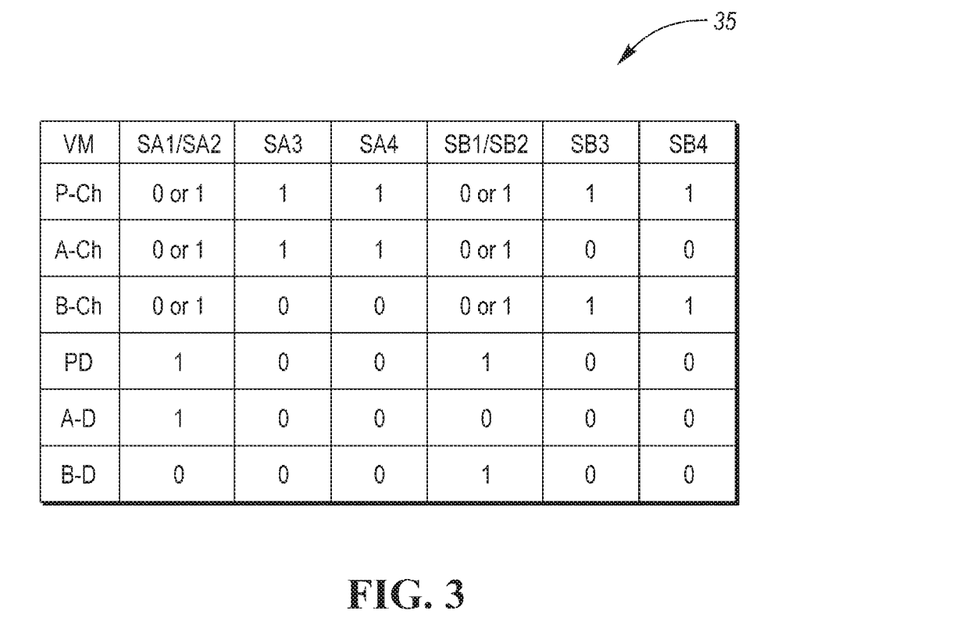
FIG. 3 is a table of possible operating modes and corresponding switching states for control of the electrical system shown in FIG. 2.

Referring to FIG. 3, logic state table 35 includes a vehicle mode column (VM) and multiple switch state columns SA1/SA2, SA3, SA4, SB1/SB2, SB3, and SB4. Each column is labeled with the switch identifier corresponding to the labels used in FIG. 2, i.e., SA1-SA4 and SB1-SB4. Pre-charge switches SA1P and SB1P are omitted from FIG. 3, but corresponding states of the pre-charge switches SA1P and SB1P of FIG. 2 are described below where relevant.

Switches SA1-SA4, SB1-SB4, SA1P, and SB1P may be embodied as electro-mechanical switches such as contactors or relays, which can block current flow in either direction. Alternatively, the switches SA1-SA4, SB1-SB4, SA1P, and SB1P may be configured as semiconductor switches such as IGBTs or MOSFETs, with or without anti-parallel connected diodes, employed singly or in combination. Switches SA3-SA4 and SB3-SB4, being utilized during charging solely to pass current in only one direction, may also be configured as a diode. As will be appreciated by those of ordinary skill in the art, many types of commercially-available semiconductor switches are able to block current flow in one direction, a characteristic that potentially requires back-to-back connection of such switches for bi-direction current blocking and, in some cases, the use of the above-noted anti-parallel connected diodes. Logic state table 35 is populated with corresponding mode-specific switch open/closed states, with "0" corresponding to an open/non-conducting switch state in which an open circuit is formed, and "1" corresponding to a closed switch state in which the switch is conducting electricity.

Possible operating modes that are selectable in real-time by the controller 50 of FIG. 2 according to the logic state table 35 of FIG. 3 include a power-down mode (omitted for clarity), a parallel charging mode (P-Ch), individual charging modes for the battery modules 12A and 12B (A-Ch and B-Ch, respectively), a parallel drive mode (PD), and individual drive modes (A-D and B-D). Each operating mode will now be described in turn.

POWER-DOWN MODE: when the vehicle 20 of FIG. 1 is placed in a true off state, such as when the controller 50 detects that the vehicle 20 has been parked in a key-off state and is not charging or otherwise running, the controller 50 commands the switches SA1-SA4 and SB1-SB4 to open via the switching control signals (arrow $CC_0$) of FIG. 2. The battery modules 12A and 12B are thereby electrically disconnected from each other, as well as from the F-TPIM 25 and R-TPIM 125, and from the HV accessory circuits 18 and 180. The switches remain in the open state until such time as a drive or charging mode is requested.

PARALLEL CHARGE MODE (P-Ch): with an example 400 volt charging voltage provided from the DC fast-charging station 30 (FIG. 1), the switches SA3, SA4, SB3, and SB4 of FIG. 2 are commanded closed. This action of the controller 50 allows the off-board DC fast-charging station 30 of FIG. 1 to rapidly charge the battery modules 12A and 12B in parallel. Additionally, the propulsion system circuits, including F-TPIM 25 and R-TPIM 125, and the HV accessory circuits 18 and 180, can be connected in parallel to the DC fast-charging station 30. This state allows either high-voltage accessory power circuit 18 or 180 to provide accessory power needed to operate fans, pumps, controllers, etc., during charging. Depending on whether such accessory power is needed, the states of switches SA1, SA2, SB1, and SB2 may be off or on, as indicated by "0 or 1" in FIG. 3.

INDIVIDUAL CHARGING MODES (A-Ch, B-Ch): the battery modules 12A and 12B may be charged individually using the topology shown in FIG. 2, i.e., battery module 12A may be charged without charging battery module 12B and vice versa. For instance, when charging battery module 12A, switches SA3 and SA4 of FIG. 2 are closed and switches SB3 and SB4 are opened. The opposite switching states are commanded by the controller 50 when charging battery module 12B, i.e., switches SB3 and SB4 are commanded closed and switches SA3 and SA4 are commanded open. As with the parallel charging mode, the states of switches SA1, SA2, SB1, and SB2 depend on whether accessory power is required.

PARALLEL DRIVE MODE (PD): in parallel drive mode, the controller 50 of FIG. 2 closes the switches SA1, SA2, SB1, and SB2. The remaining switches SA3, SA4, SB3, and SB4 are commanded open. This control action electrically connects the battery module 12A to the F-TPIM 25 and the HV accessory circuit 18, and also connects the battery module 12B to the R-TPIM 125 and the HV accessory circuit 180.

The pre-charge switches SA1P and/or SB1P, both shown in an open state in FIG. 2, may be used to pre-charge an external capacitance before closing the switches SA1 and/or SB1. Additionally, in the event the battery modules 12A and 12B are at significantly different states of charge, such that a high electrical current would tend to flow between the battery modules 12A and 12B, closing of pre-charge switches SA1P and/or SB1P would help limit such current flow and thereby allow for equalization.

With the switches SA1, SA2, SB1, and SB2 closed/conducting, the battery modules 12A and 12B and the respective HV accessory circuits 18 and 180 are connected in electrical parallel via the electrical cables 15 and 19 extending between power connectors D of FIG. 2. This external connection provides current flow paths across the electrical cables 15 and 19 for balancing the currents while ensuring that the battery modules 12A and 12B maintain at the same state of charge, regardless of the power balance between the F-TPIM 25 and the R-TPIM 125. As part of the parallel drive mode, the switch pairs SA3, SA4 and SB3, SB4 are opened by the controller 50 to isolate connector pins of the DC charge connector 40.

INDIVIDUAL DRIVE MODES (A-D, B-D): battery modules 12A and 12B may be used individually/separately to power the front and rear wheels 14F or 14R of FIG. 1 in drive modes A-D and B-D, respectively. For drive mode A-D, for instance, the controller 50 closes the switches SA1 and SA2 and opens the remaining switches. Likewise, the controller 50 closes the switches SB1 and SB2 and opens the remaining switches when implementing drive mode B-D.

The topology of FIG. 2 therefore enables the multiple operating modes of FIG. 3. AWD propulsion is enabled using either of the battery module 12A or the battery module 12B, or by using both battery modules 12A and 12B in parallel. Similarly, the topology enables DC fast-charging of battery module 12A, the battery module 12B, or both battery modules 12A and 12B in parallel. Operation of the vehicle 20 of FIG. 1 is enabled using either of the battery modules 12A or 12B in the event the other of the battery modules 12A or 12B experiences a fault mode. As a DC fast-charging current is shared by the battery modules 12A and 12B, i.e., split via the splice device 300, lower current-rated hardware components may be used within the battery pack 10.

It may be desirable in some applications to use the battery modules 12A and 12B to simultaneously power coupled loads independently of one another. This benefit is enabled with alternative topology of FIG. 4. Relative to FIG. 2, the topology of FIG. 4 has one pin of the connector D of each battery module 12A and 12B that is not connected externally. Also, one pin of the connector A of each respective battery modules 12A and 12B is electrically connected to the corresponding connector D of the other battery module 12B or 12A, i.e., connector A of battery module 12A is connected to connector D of battery module 12B and vice versa. The various modes enabled by the alternative topology are described below with reference to FIG. 5.

Figure 4:
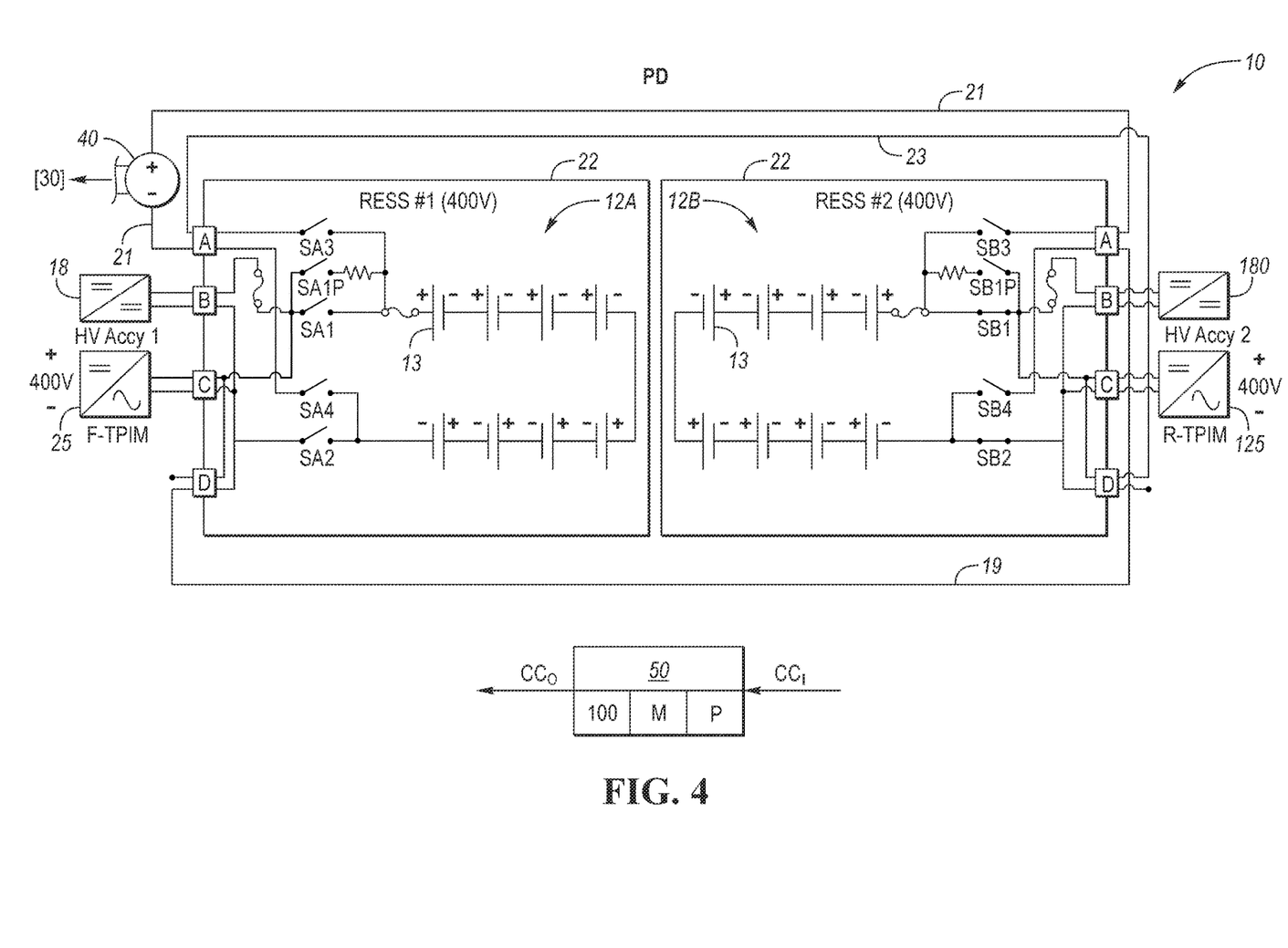
FIG. 4 is a schematic circuit diagram of a dual-RESS electrical system and a controller according to an alternative embodiment in which front and rear drive axles of the vehicle shown in FIG. 1 are independently powered via a corresponding RESS.

In the topology of FIG. 4, unlike that of FIG. 2, the propulsion-related contactors of the battery modules 12A and 12B are used for establishing the parallel charging mode (P-Ch). As a result, contactor failure during DC fast-charging adversely affects drive mode options. However, parallel or independent operation of the battery modules 12A and 12B is enabled, with independent operation not available in the FIG. 2 embodiment. With independent operation, a front/rear load power split can be used to balance the SOC of the battery modules 12A and 12B. Such independent operation and charging of the battery modules 12A and 12B also provides redundant propulsion systems in the event of a single point failure of either battery module 12A or 12B, whereby a given module 12A or 12B is operable but mismatched, such that the module 12A or 12B cannot be connected in parallel with the other module 12B or 12A, thereby increasing robustness of the battery pack 10A of FIG. 4. Such benefits of FIG. 4 come with a hardware trade-off: absent the splice device 300 of FIG. 2, the enabled high-current charging requires associated high-current switches and conductors within the battery modules 12A and 12B. For example, internal cables may be liquid cooled for reduced packaging relative to fan-cooled cables.

Figure 5:
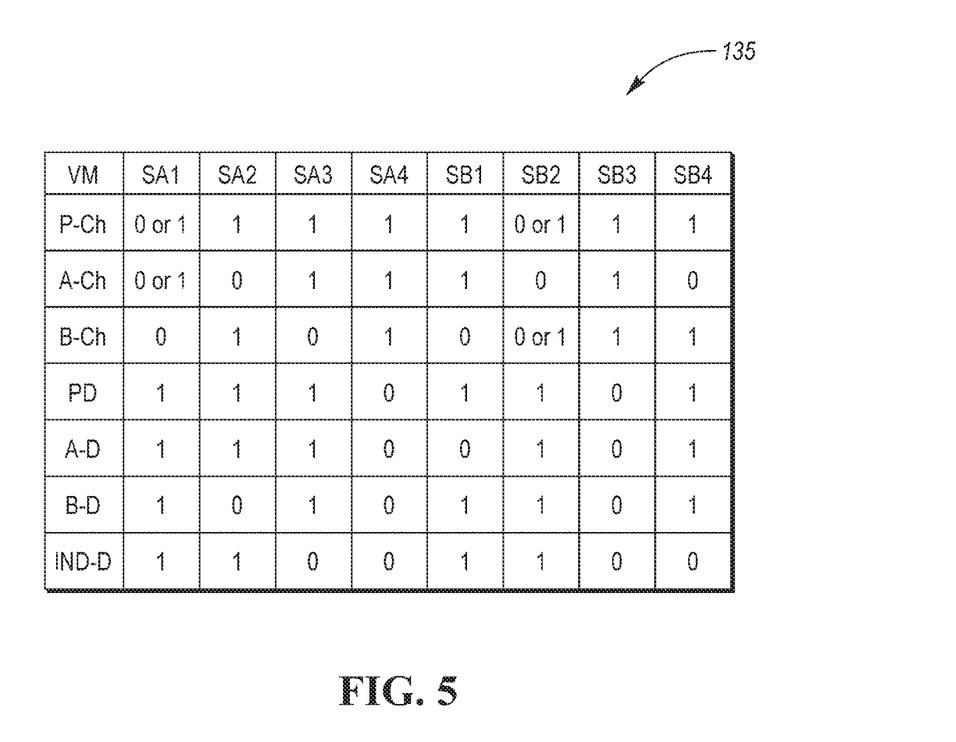
FIG. 5 is a table of possible operating modes and corresponding switching states for control of the electrical system shown in FIG. 4.

FIG. 5 illustrates possible operating modes selectable in real-time by the controller 50 of FIG. 2 according to a logic state table 135. As with the logic state table 35 of FIG. 3, the power-down mode is omitted for clarity but included, as described above. The prior-described parallel charging mode (P-Ch), individual charging modes for the battery modules 12A and 12B (A-Ch and B-Ch, respectively), and parallel drive mode (PD), and individual drive modes (A-D and B-D) are also available in the FIG. 4 topology, with the logic state differences noted below. An independent propulsion mode (IND-D) is also enabled.

PARALLEL CHARGE MODE (P-Ch): with an example 400 volt charging voltage provided from the DC fast-charging station 30 (FIG. 1), the switches SA2, SA3, SA4, SB1, SB3, and SB4 are commanded closed. Depending on whether such accessory power is needed, the states of switches SA1 or SB2 may be off or on, as indicated by "0 or 1" in FIG. 5. As noted above with reference to FIG. 3, this state allows either accessory power circuit 18 or 180 to provide accessory power needed to operate fans, pumps, controllers, etc., during charging.

INDIVIDUAL CHARGING MODES (A-Ch, B-Ch): the battery modules 12A and 12B may be charged individually using the topology shown in FIG. 4, i.e., battery module 12A may be charged without charging battery module 12B and vice versa. For instance, when charging the battery module 12A in mode A-Ch, switches SA3, SA4, SB1, and SB3 of FIG. 4 are closed and switches SB2 and SB4 are opened. The state of switches SA1 and SA2 may be 0 or 1 depending on whether accessory power is required. For mode B-Ch, switches SA2, SA4, SB3, and SB4 are closed and switches SA1 and SA3 are opened. The state of switch SB1 and SB2 may be 0 or 1, again depending on whether accessory power is required.

PARALLEL DRIVE MODE (PD): in parallel drive mode, the controller 50 of FIG. 4 closes switches SA1, SA2, SA3, SB1, SB2, and SB4. The remaining switches SA4 and SB3 are commanded open. This control action electrically connects the battery module 12A to the F-TPIM 25 and the HV accessory circuit 18, and also connects the battery module 12B to the R-TPIM 125 and the HV accessory circuit 180. Battery modules 12A and 12B are connected in parallel through cables 19 and 23.

INDIVIDUAL DRIVE MODES (A-D, B-D): either battery module 12A or 12B may be used individually to power the front and rear drive wheels 14F and 14R of FIG. 1 in drive modes A-D and B-D, respectively, as with the embodiment of FIG. 2. For drive mode A-D, for instance, the controller 50 closes switches SA1, SA2, SA3, SB2, and SB4 and opens the remaining switches SA4, SB1, and SB3. Likewise, the controller 50 closes switches SA1, SA3, SB1, SB2, and SB4 and opens the remaining switches SA2, SA4, and SB3 when implementing drive mode B-D. In propulsion mode A-D, i.e., using the battery module 12A and not battery module 12B, an additional pre-charge contactor (not shown) may be used with switch SA3. Such an embodiment may be useful for driving loads on battery module 12B during a failure mode.

INDEPENDENT DRIVE MODE (IND-D): independent drive in AWD mode is possible using the battery modules 12A and 12B. That is, battery module 12A powers the front drive axle 11F and the battery module 12B powers drive axle 11R. In the independent drive mode, the controller 50 commands the switches SA1, SA2, SB1, and SB2 to close. The remaining switches SA3, SA4, SB3, and SB4 are commanded open. The mode differs from individual drive modes A-D and B-D in that the front and rear TPIMs 25 and 125 and respective accessory circuits 18 and 180 are not connected in parallel, which allows the front TPIM 25 and accessories 18 to be powered solely by the front RESS, i.e., battery module 12A, and the rear TPIM 125 and accessories 180 to be powered solely by the rear RESS, i.e., battery module 12B.

The battery packs 10 and 10A of FIGS. 2 and 4, respectively, are usable with the vehicle 20 of FIG. 1 to enable the various operating modes respectively depicted in FIGS. 3 and 5. The disclosed topologies enable full operating mode flexibility during propulsion and charging operations via coordinated control by the controller 50 of the switching states of the various switches SA1-4 and SB1-4 of FIGS. 2 and 4. Limited operation is thus possible using either battery module 12A or 12B during failure of one of the battery modules 12A or 12B, while also providing multiple methods for rebalancing or equalizing the SOC of the battery pack 10 via either parallel charge/discharge or independent operation. As a result, a single configuration of the battery module 12A and 12B, identically configured, provides flexibility to implement multiple operating modes through simple external cable connections as set forth above. Moreover, the configuration of FIG. 3 allows the controller 50 to detect a fault mode in which a fault is present in the first or second battery modules 12A or 12B, and to enter a default drive or charging mode using the first or second battery module 12A or 12B that is not experiencing the fault.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

The invention claimed is:

1. An electrical system for use with an offboard DC fast-charging station, the electrical system comprising:
   a plurality of electrical cables;
   a direct current (DC) charge connector configured to connect to the offboard DC fast-charging station;
   first and second battery modules each having at least three electrical connectors configured to receive a respective one of the plurality of electrical cables, the first and second battery modules being electrically interconnected to each other via the plurality of electrical cables, and further having respective battery cell strings and first, second, third, and fourth switches that selectively connect the battery cell strings to one or more of the electrical connectors;
   wherein the direct current (DC) charge connector is electrically connected to one of the plurality of electrical cables between the first electrical connectors of the first and second battery modules;
   a splice device configured to split a charging current from the off-board DC fast-charging station between the first and second battery modules; and
   a controller in communication with the first, second, third, and fourth switches of each of the first and second battery modules, configured to receive input signals indicative of a requested operating mode of the battery pack, and, in response to the input signals, to command an open/closed state of each of the first, second, third, and fourth switches of the first and second battery modules, via a set of switching control signals, to thereby selectively establish an operating mode inclusive of: a parallel charging mode, a parallel drive mode, and separate drive and charging modes for each of the first and second battery modules.

2. The electrical system of claim 1, wherein the at least three electrical connectors includes first, second, and third electrical connectors, and wherein:
   the first and second switches of the first and second battery modules, when in a closed state, connect the battery cell strings of a respective one of the first and second battery modules to the second and third electrical connectors of the first and second battery modules, respectively; and
   the third and fourth switches of the first and second battery modules, respectively, when in a closed state, connect the battery cell strings of a respective one of the first and second battery modules to the first electrical connector of the first and second battery modules, respectively.

3. The electrical system of claim 2, wherein the at least three electrical connectors includes a fourth electrical connector, further comprising: first and second high-voltage accessory modules directly connected to the fourth electrical connector of the first and second battery modules, respectively, wherein in the parallel charging mode, the first and second switches of the respective first and second battery modules, in a closed state, connect the first and second battery modules to the respective high-voltage accessory module.

4. The electrical system of claim 2, wherein the first and second battery modules are electrically interconnected to each other via the electrical cables via the respective second electrical connectors of the first and second battery modules.

5. The electrical system of claim 1, further comprising: first and second traction power inverter modules (TPIMs) directly connected to the third electrical connector of the first and second battery modules, respectively, and first and second electric machines connected to the first and second TPIMs, respectively.

6. The electrical system of claim 5, wherein the electrical system is used aboard a motor vehicle having front and rear drive wheels respectively connected to front and rear drive axles, and the controller is configured to discharge the first and second battery modules singly or in parallel to provide the vehicle with all-wheel drive propulsion capability.

7. The electrical system of claim 1, wherein the first and second battery modules have a respective first surface to which the electrical connectors of the respective first and second battery modules are connected, and a second surface positioned opposite the first surface and characterized by an absence of the electrical connectors, and wherein the first and second battery modules are arranged in the battery pack such that the second surfaces are positioned immediately adjacent to one another.

8. The electrical system of claim 1, wherein the controller is configured to detect a fault mode in which a fault is present in the first or second battery modules, and to enter a default drive or charging mode using the first or second battery module that is not experiencing the fault.

9. The electrical system of claim 1, wherein at least one switch of the first, second, third, and fourth switches of the first and second battery modules is an electro-mechanical contactor.

10. The electrical system of claim 1, wherein at least one switch of the first, second, third, and fourth switches of the first and second battery modules is a semiconductor diode.

11. An electrical system for use with an off-board DC fast-charging station, the electrical system comprising:
   a battery pack having:
      a plurality of electrical cables;
      first and second battery modules electrically interconnected to each other via the plurality of electrical cables, the first and second battery modules having respective battery cell strings, first, second, and third electrical connectors, and first, second, third, and fourth switches that selectively connect the respective battery cell strings to one or more of the first, second, and third electrical connectors, wherein the first electrical connector of the first battery module is connected to the second electrical connector of the second battery module via one of the cables, and the first electrical connector of the second battery module is connected to the second electrical connector of the first battery module via another of the cables;
   a direct current (DC) charge connector electrically connected to one of the electrical cables between the first electrical connectors of the first and second battery modules, the DC charge connector being configured to electrically connect the battery pack to the off-board DC fast-charging station; and
   a controller in communication with the first, second, third, and fourth switches of each of the first and second battery modules, and configured to receive input signals indicative of a requested operating mode of the battery pack, and, in response to the input signals, to select an open/closed state of each of the first, second, third, and fourth switches of the first and second battery modules, via a set of switching control signals, to thereby selectively establish: a parallel charging mode, a parallel drive mode, drive and charging modes for each of the first and second battery modules, and an independent drive mode in which the first and second battery modules are operable for independently powering the respective second and third electrical connectors in the event of a failure of the respective second or first battery module.

12. The electrical system of claim 11, further comprising: first and second high-voltage accessory modules connected to the respective first and second battery modules via the third electrical connectors.

13. The electrical system of claim 11, wherein:
   the first and second switches of the first and second battery modules, when in a closed state, connect the battery cell strings of a respective one of the first and second battery modules to the second and third electrical connectors of the first and second battery modules, respectively; and
   the third and fourth switches of the first and second battery modules, respectively, when in a closed state, connect the battery cell strings of a respective one of the first and second battery modules to the first electrical connector of the first and second battery modules, respectively.

14. The electrical system of claim 11, wherein the first and second battery modules have a corresponding fourth electrical connector, further comprising: first and second high-voltage accessory modules directly connected to the fourth electrical connector of the first and second battery modules, respectively, wherein in the parallel charging mode, the first and second switches of the respective first and second battery modules, in a closed state, connect the first and second battery modules to the respective high-voltage accessory module.

15. The electrical system of claim 11, further comprising: first and second traction power inverter modules (TPIMs) directly connected to the third electrical connector of the first and second battery modules, respectively, and first and second electric machines connected to the first and second TPIMs, respectively.

16. The electrical system of claim 15, wherein the modular battery pack system is used aboard a motor vehicle having front and rear drive wheels respectively connected to front and rear drive axles, and wherein the motor vehicle has all-wheel drive propulsion using the first and second battery modules singly or in parallel.

17. The electrical system of claim 11, wherein the first and second battery modules have a respective first surface to which the electrical connectors of the respective first and second battery modules are connected, and a second surface positioned opposite the first surface and characterized by an absence of the electrical connectors, and wherein the first and second battery modules are arranged in the battery pack such that the second surfaces are positioned immediately adjacent to one another.

18. The electrical system of claim 11, wherein the controller is configured to detect a fault mode in which a fault is present in the first or second battery modules, and to enter a default drive or charging mode using the first or second battery module that is not experiencing the fault.

19. The electrical system of claim 11, wherein at least one switch of the first, second, third, and fourth switches of the first and second battery modules is an electro-mechanical contactor.

* * * * *

UNITED STATES PATENT AND TRADEMARK OFFICE
CERTIFICATE OF CORRECTION

PATENT NO. : 10,596,917 B2
APPLICATION NO. : 16/102802
DATED : March 24, 2020
INVENTOR(S) : Brendan M. Conlon et al.

It is certified that error appears in the above-identified patent and that said Letters Patent is hereby corrected as shown below:

On the Title Page

Please replace the Title Page with the attached Title Page

In the Claims

Column 14, Line 67, Claim 20 should be added as follows:
20. The electrical system of claim 11, wherein at least one switch of the first, second, third, and fourth switches of the first and second battery modules is a semiconductor diode.

Signed and Sealed this
Nineteenth Day of January, 2021

Andrei Iancu
*Director of the United States Patent and Trademark Office*

(12) United States Patent
Conlon et al.

(10) Patent No.: US 10,596,917 B2
(45) Date of Patent: Mar. 24, 2020

(54) VEHICLE AND ELECTRICAL SYSTEM WITH DUAL BATTERY MODULES

(71) Applicant: GM Global Technology Operations LLC, Detroit, MI (US)

(72) Inventors: Brendan M. Conlon, Rochester Hills, MI (US); Shifang Li, Shelby Township, MI (US); Kris Sevel, Rochester Hills, MI (US); Russell K. Steele, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 16/102,802

(22) Filed: Aug. 14, 2018

(65) Prior Publication Data
US 2020/0055404 A1 Feb. 20, 2020

(51) Int. Cl.
*H02J 7/00* (2006.01)
*B60L 53/30* (2019.01)
*B60L 53/14* (2019.01)
*B60K 6/52* (2007.10)

(52) U.S. Cl.
CPC .............. *B60L 53/30* (2019.02); *B60L 53/14* (2019.02); *B60K 6/52* (2013.01); *B60L 2230/30* (2013.01); *B60Y 2200/91* (2013.01); *B60Y 2200/92* (2013.01); *B60Y 2300/91* (2013.01); *B60Y 2400/61* (2013.01)

(58) Field of Classification Search
CPC .................................. B60L 53/30; B60L 53/14
USPC .............................. 320/109; 701/22; 307/9.1
See application file for complete search history.

(56) References Cited

U.S. PATENT DOCUMENTS

2015/0273995 A1* 10/2015 Muto ................. B60L 7/14
180/68.5
2016/0211680 A1* 7/2016 Ganor ................ H02J 7/0011

* cited by examiner

*Primary Examiner* — Zixuan Zhou
(74) *Attorney, Agent, or Firm* — Quinn IP Law (57) ABSTRACT

An electrical system includes cables, a DC charge connector, first and second battery modules, a splice device, and a controller. Each battery module has first, second, third, and fourth electrical connectors receiving a respective one of the cables. The battery modules are connected to each other via the cables, and further have first, second, third, and fourth switches that connect battery cell strings to one or more connectors. The charge connector is connected to one of the cables between the first electrical connectors. The splice device connects the charge connector to the first connector of the first battery module and to a pair of the cables. A charging current may be split between the battery modules. The controller selectively establishes parallel charging, parallel drive, and separate drive and charging modes for each battery module. The system may have an independent drive mode.

20 Claims, 4 Drawing Sheets